June 5, 1962  A. J. A. J. DUJARDIN  3,037,632
ROTARY FILTER WITH A PRE-FILTERING LAYER
Filed Aug. 30, 1957
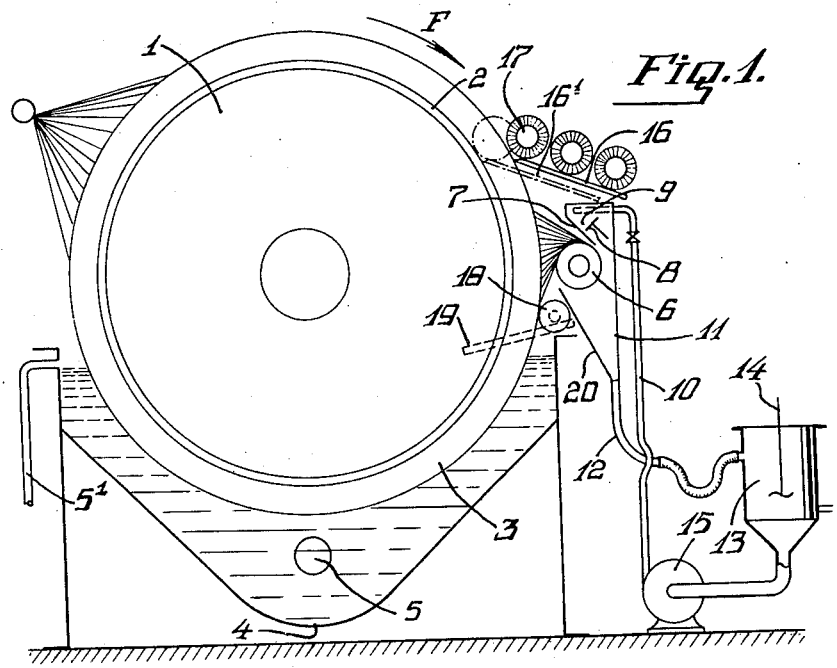
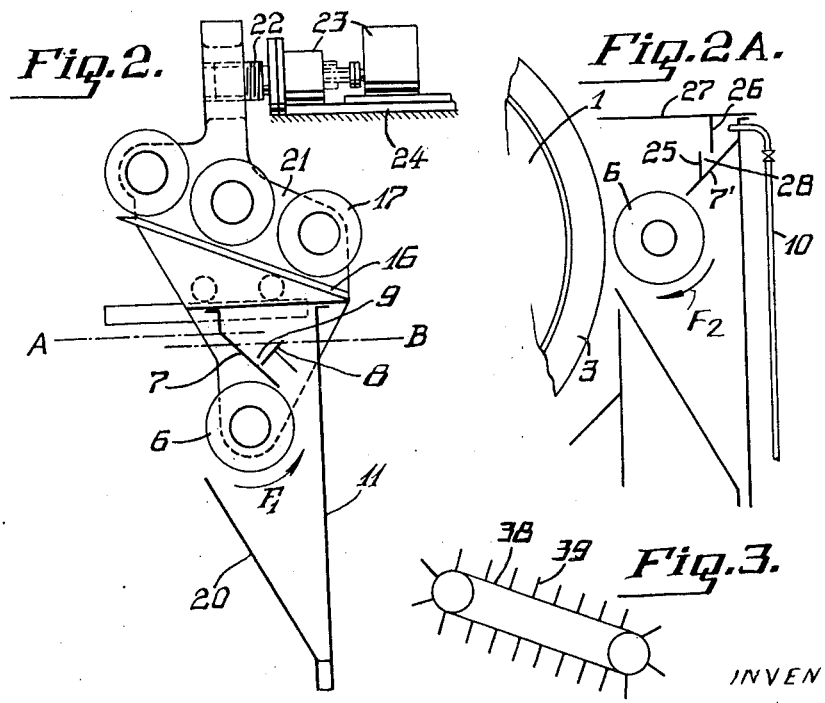
INVENTOR:
ALBERT JEAN ARMAND JULIEN DUJARDIN
By Squire & Olcott
ATTYS.

United States Patent Office 3,037,632
Patented June 5, 1962

3,037,632
ROTARY FILTER WITH A PRE-
FILTERING LAYER
Albert Jean Armand Julien Dujardin, Remicourt, Belgium, assignor to Ecremeuses Melotte Societe Anonyme, Remicourt, Belgium, a Belgian company
Filed Aug. 30, 1957, Ser. No. 681,194
3 Claims. (Cl. 210—193)

The present invention relates to rotary filters having a pre-filtering layer of a filter adjuvant and comprising a drum having a substantially horizontal axis the lower portion of the drum in a vessel containing the liquid to be filtered.

The object of the invention is to overcome difficulties and inconveniences occurring in prior filtering apparatus which use a fluid filter adjuvant suspension under pressure and atomizer nozzles. In such filter, the nozzles become clogged easily and wear rapidly. This requires previous clarification of the suspension to be atomized and also involves frequent replacement of the atomizer nozzles whose orifices become worn and enlarged due to the abrasive action of the suspended solids passing at high speed through the nozzle.

According to the invention, the distribution of the filter adjuvant is effected by a rotary distribution cylinder which extends along substantially the entire length of a filter drum and which receives the suspension of solids. The adjuvant is thrown from the cylinder by centrifugal force in the form of jets or sheets directed toward the periphery of the drum.

Other important features and advantages of the invention will become apparent from the following description with reference to the accompanying drawings which show a preferred embodiment of the invention by way of example, and in which:

FIGURE 1 is a diagrammatic end elevation of the assembly of the installation;

FIGURE 2 is an enlarged detail view of the distributor device;

FIGURE 2A shows a modification of the distributor device, and

FIGURE 3 shows a detail of modified cleaning means for the doctor blade.

In FIGURE 1 there is shown a rotary drum 1 adapted to rotate in the direction indicated by the arrow F and having a porous periphery provided by a filter cloth 2 and a deposited layer 3 of filtering adjuvant.

The liquid to be filtered is passed into the trough 4 by a pipe 5, said trough having an overflow 5'.

According to the invention a rotary cylinder 6 is provided for the distribution of the pre-filtering layer 3 of adjuvant and the cylinder extends longitudinally substantially coextensively with the drum 1 and, when rotating in the direction of the arrow F1 (FIGURE 2) receives the fluid adjuvant and throws it by centrifugal force as a thin liquid sheet, which leaves the cylinder at an angle of approximately 30° with the vertical.

The thin liquid sheet is deposited along the length of the rotary cylinder 6 by an inclined piece of sheet metal 7 the lower end of which is situated a short distance above the cylinder 6.

With the sheet metal piece 7 co-operates a sheet metal piece 8 which is disposed perpendicular relative to the sheet metal piece 7, but the lower end of this sheet metal piece 8 is slightly spaced away from the upper face of the sheet metal piece 7 in such a manner as to leave a gap through which flows the fluid adjuvant suspension to be projected.

This gap is adjustable by sliding the sheet metal piece 8 in such a manner as to regulate the flow rate of the adjuvant supplied to the rotary cylinder.

Thus a distributor is formed constituted by two sheet metal pieces 7—8 forming between them a V-shaped chamber 9, each of which includes a natural sliding angle with the horizontal plane. In practice, these two pieces of sheet metal should each include an angle larger than 35° with the horizontal.

The sheet metal piece 7 is inclined at 45°, and its lower end is situated a short distance away from the periphery of the cylinder 6.

This lower end is situated substantially in a plane passing through the rotational axis of the cylinder 6 and inclined at an angle of 60° with the horizontal.

This angle may be varied in accordance with the viscosity of the adjuvant suspension to be projected but is normally between the limits of 45 and 90°.

As indicated in the drawings, the upper edge of the sheet metal piece 8 is situated in a horizontal plane B slightly below the horizontal plane A passing through the upper edge terminating the inclined plane 7.

The fluid adjuvant in the V-shaped chamber 9 is maintained at a constant level, being supplied by a tube 10; in order to maintain this level the excess liquid may overflow over the upper edge of the sheet metal piece 8, and drop into a collector 11 in order to return by gravity through a pipe 12 into a preparation vat 13 where an agitator 14 prevents any sedimentation. The adjuvant is taken out of the vat 13 by a pump 15 which discharges into the duct 10 for the supply of the distributor.

Preferably the periphery of the cylinder 6 is roughened. Experience has shown that a knurled cylinder of 100 millimetres diameter rotating at 300 to 1600 r.p.m. gives satisfactory results.

The flat inclined sheet metal piece 7 may likewise advantageously be roughened on its upper surface in order that its entire surface may be uniformly wetted and may thus ensure uniform spreading of the liquid layer.

The liquid to be projected which flows as a thin uniform sheet from the distributor is caught in its free drop by the cylinder 6 and is thrown into the ambient space tangentially of the cylinder and thus projected in the state of droplets on to the sector to be re-loaded of the drum 1 the interior of which is under vacuum.

However, if the drum is subject to an external pressure exceeding the atmospheric pressure the depositing of the adjuvant is also effected correctly.

The suspension to be projected is usually constituted by $CaCO_3$, infusorial earth or other filtering material of mineral origin, but may also be constituted by starch or shredded cellulose if it is desired to filter liquids containing muds of organic origin.

After being thrown off by the rotary distribution cylinder the readjuvant becomes atomized into droplets which are deposited on the desired peripheral portion of the filter drum; the liquid of the adjuvant passing through the layer previously formed, and the solids become fixed on the outside of the layer.

The concentration of solids as well as the flow rate of the suspension mechanically atomized by the cylinder 6 are such that the thickness of the layer of solid matter 3 fixed on the drum 1 is slightly greater than necessary for the filtration of the muddy liquid stored in the trough 4. This extra thickness prevents the progressive fouling of the pre-filtering layer which thus remains immaculate for an unlimited duration.

After a revolution of the drum, the external layer and the impurities filtered out of the liquid to be clarified are removed by a doctor blade 16 which continuously scrapes the layer 3. Owing to this fact, the peripheral portion of the drum which is presented to the zone of mechanical projection is immaculate and free of any impurity at the moment of receiving the droplets thrown off by the roughened cylinder 6.

Owing to its V-shape and to the disposition described, the chamber 9 is designed to prevent any premature sedimentation of the solids in suspension in the fluid adjuvant.

In order to permit as complete as possible a utilization of the effective surface of the filtering drum, the doctor blade 16 is arranged to engage the descending portion of the drum surface at approximately 45° from the horizontal diametrical plane, and for maintaining this blade clean and removing the residues of the filtration, provision is made for arranging one or more circular brushes 17 rotating at a convenient speed.

These brushes are juxtaposed and are in general contiguous and act in such a manner as to sweep that face and to remove the residues outwardly.

These brushes may be replaced by other means, for example by one or more endless chains 38 (FIGURE 3) carrying scrapers 39 which convey the residues of filtration into a collector (not shown).

Provision is made moreover to place, if desired, at the end of the adjuvant depositing zone and parallel to the roller 6, a smooth or roughened roller 18 which equalizes and slightly compresses the layer 3. The two ends of the shaft of the compressing roller 18 may roll or slide on inclined tracks 19 fixed on the frame of the rotary filter beyond both ends of the drum.

A further feature of the filter according to the present invention consists in the use of a knurled, roughened or smooth rotary cylinder, rotating a suitable speed which catches and throws the suspension of solids constituting the filtering layer in the form of droplets towards the freshly scraped zone of the layer 3 of the rotary filter.

All the faces constituting the distributor of the thin liquid sheet are inclined in order to prevent any premature sedimentation.

A piece of sheet metal 20 of the collector is arranged in such a manner as to collect the projected droplets which may belatedly leave the rotary cylinder 6.

By reason of the device for brushing, or mechanically cleaning which is placed immediately behind the scraping edge of the doctor blade 16, it is possible to place the latter immediately above the zone where the adjuvant is deposited.

In the embodiment illustrated the doctor blade 16 and the distributor are mounted on a common support 21 which may be moved by means of a screw 22 driven by a fixed motor-reduction gear unit 25 mounted on the stationary frame 24.

Under the action of this unit the knife 16 may be moved to the position shown at 16′ (FIGURE 1) together with the brushes 17, and the cylinder 6 may be advanced towards the drum 1 to an extent corresponding to the movement of the doctor blade 16 in such a manner that the redepositing of adjuvant can always be effected in proportion to the quantity removed.

Apart from the advantages already mentioned it has been found possible to effect the redepositing of adjuvant without recourse to a pre-filtering of the adjuvant suspension, and without having to control the amount of supply of this suspension too accurately, notably because of recirculation of the adjuvant the absence of any premature sedimentation.

FIGURE 2A shows to a modification of an embodiment in which the cylinder 6, instead of rotating in the sense indicated by the arrow F1 in FIGURE 2, rotates in that of the arrow F2, which gives rise to a better distribution of the liquid after the same has come into contact with the cylinder 6.

In this case the sheet metal piece 7 is moved to 7′, the sheet metal piece 8 is dispensed with, and the sheet metal 7′ carries an overflow weir 25.

The liquid supplied by the pipe 10 firstly hits a sheet metal piece 26 integral with the lide 27, then flows downwardly into the space 28 from where it is moved on to the cylinder 6 by overflowing the weir 25.

What I claim is:

1. A continuously rotating precoat filter comprising a permeable filtering drum having a substantially horizontal axis and provided on its peripheral surface with an inner layer of cloth and an outer layer of solid deposited adjuvant, a tank for containing liquor to be filtered encompassing the lower portion of said drum, said drum being hollow and adapted to have its interior connected to a vacuum pump, a supply of sedimentatious fluid filter adjuvant for forming a filtering layer on said drum, a revoluble distribution cylinder mounted adjacent to said tank with its axis parallel to the axis of said drum and with its periphery spaced from that of the upper portion of said drum, the length of said cylinder being substantially coextensive with that of said drum, a downwardly inclined flow sheet directed toward said cylinder, means for feeding filter adjuvant from said supply to said inclined flow sheet and for depositing said adjuvant fluid along the length of said cylinder, said cylinder revolving at a speed sufficient for said adjuvant deposited along its periphery to be thrown against and deposited upon the periphery of said drum by centrifugal force in the form of a sheet-like projection, and doctor blade means arranged above said distributing cylinder engaging said layer of deposited adjuvant and arranged so as to continuously scrape off a surface portion thereof, said doctor blade means engaging a portion of said adjuvant layer which has passed through said liquid to be filtered and which is about to have further adjuvant fluid deposited thereon by said cylinder, the said inclined flow sheet having its lower edge in closely spaced relation above the periphery of the rotating distributing cylinder and on the side thereof opposite said filtering drum in such position as to deliver said adjuvant fluid to the mid portion of the upper outer quadrant of said cylinder, a second sheet cooperating with the inclined sheet, said second sheet being disposed at an angle of between 40 and 90 degrees with respect to said inclined sheet and the lower end of said second sheet being in closely spaced relation to the upper surface of the first inclined sheet, the said two sheets cooperating so as to form between them a distributing chamber.

2. A continuously rotating precoating filter according to claim 1 wherein the outer face of the distributing cylinder is roughened.

3. A continuously rotating precoating filter according to claim 1, wherein a common support is provided for said cylinder and said doctor blade means, and wherein means is provided for horizontally moving said support whereby to simultaneously move said cylinder and said blade means with respect to said drum.

References Cited in the file of this patent

UNITED STATES PATENTS

| | | |
|---|---|---|
| 444,231 | Brooks | Jan. 6, 1891 |
| 1,076,880 | Giencke | Oct. 28, 1913 |
| 1,796,491 | Sweetland | Mar. 17, 1931 |
| 1,803,792 | Christensen | May 5, 1931 |
| 2,102,780 | Bielfeldt | Dec. 21, 1937 |
| 2,715,466 | Esposito | Aug. 16, 1955 |
| 2,798,424 | Smith et al. | July 9, 1957 |
| 2,839,194 | Lopker et al. | June 17, 1958 |
| 2,887,044 | Smejda | May 19, 1959 |

FOREIGN PATENTS

| | | |
|---|---|---|
| 343,790 | Germany | Nov. 9, 1921 |